United States Patent Office 2,840,569
Patented June 24, 1958

2,840,569

3-ALKOXYPHTHALIDES

Donald D. Wheeler and David C. Young, Midland, Mich., assignors to The Dow Chemical Company, Midland, Mich., a corporation of Delaware No Drawing. Application April 30, 1956
Serial No. 581,336

6 Claims. (Cl. 260—343.3)

This invention is concerned with phthalides having the formula

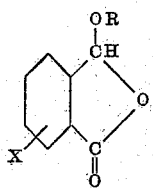

In this and succeeding formulae, R represents a lower alkyl radical containing from 4 to 8 carbon atoms, inclusive, and X is a member of the group consisting of chlorine and hydrogen. This invention also includes a method for preparing these compounds. The new compounds are colorless or amber liquids or low melting solids which are soluble in many common organic solvents such as benzene, toluene and acetone and are substantially insoluble in water. They are active as parasiticides and are adapted to be employed for the control of nematodes.

The new phthalide compounds may be obtained by causing a phthalaldehydic acid having the formula

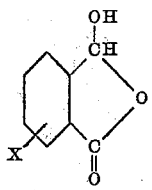

to react with an alcohol having the formula, ROH, to obtain the desired product and water of reaction. The terms "phthalaldehydic acid" and "3-hydroxyphthalide" are employed interchangeably herein to refer to a compound having the structure

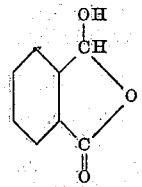

Phthalaldehydic acid is often represented in the literature as having the structure

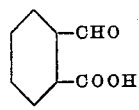

However, the acid employed in this invention and prepared as hereinafter described exists almost entirely in the closed ring 3-hydroxyphthalide structure as observed from a study of its infrared absorption spectrum. Infrared data also indicate the phthalide products of the invention to have a closed ring 3-hydroxyphthalide structure with the open chain ester sometimes being formed as a by-product.

In the synthesis, good results are obtained when substantially equimolar proportions of the reactants are employed although reasonable excesses of either reactant are operable. Phthalaldehydic acid, if used in large excess or under conditions of high temperature, may form an anhydride by-product. The reaction takes place smoothly at temperatures of from 15° to 150° C. although a range of from 90° to 120° C. is considered preferable from the standpoint of rate of reaction and convenience of operation. Solvents such as benzene and toluene may be employed as a reaction medium, if desired. The product obtained may be separated from the water of reaction by vaporization of the latter.

In a preferred method of carrying out the reaction, phthalaldehydic acid and an equimolar proportion or an excess of the appropriate hydroxy compound are mixed and heated until the mixture begins to reflux and thereafter maintained at reflux temperature for from 0.5 to 7 hours. The mixture may then be heated at atmospheric pressure to distill unreacted alcohol. The reaction mixture is then poured into water whereupon an insoluble oil precipitates. The water is decanted from the oil or solid product and the latter washed with warm water. The product, if a liquid, is dissolved in benzene and the resulting solution distilled to remove any remaining water as a benzene-water azeotrope and residual solvent. The remaining oily product may be further purified, if desired, by fractional distillation under reduced pressure.

In an alternative method, phthalaldehydic acid and an equimolar proportion or an excess of the appropriate alcohol are mixed and heated from 120° to 150° C. for 1 to 3 hours. The pressure of the system is then reduced and the water of reaction removed by distillation. The crude product is obtained as a residue and, if desired, may be purified by distillation under reduced pressure.

The following examples illustrate the invention, but are not to be construed as limiting.

*Example 1.—3-secondary-butoxyphthalide*

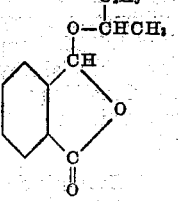

150 grams (1.0 mole) of phthalaldehydic acid and 300 milliliters (3.0 moles) of secondary butyl alcohol were mixed and heated at the boiling temperature under reflux for 7 hours. The mixture was distilled to remove the unreacted secondary butyl alcohol and the residue poured into water whereupon two layers formed. The water was decanted and the remaining oil dissolved in benzene. The resulting benzene solution was washed with water, and the benzene recovered by distilling under reduced pressure to obtain a 3-secondary-butoxyphthalide product as a yellow oily residue. The latter was fractionally distilled to obtain a purified product boiling from 174° to 177° C. at 16 millimeters pressure and having a refractive index $n_D^{20}$ of 1.5118.

*Example 2.—3-isobutoxyphthalide*

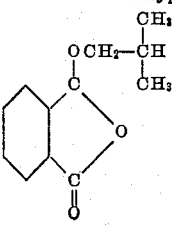

150 grams (1.0 mole) of phthalaldehydic acid and 300 milliliters (3.0 moles) of isobutyl alcohol were mixed and heated at reflux temperature for 7 hours. At the end of this period, the mixture was distilled to remove the unreacted isobutyl alcohol. The remaining solution was cooled to about 80° C. and poured into water whereupon two layers formed. The water was decanted and the remaining oil repeatedly washed with water. The combined washings were extracted with benzene. The benzene extract and oil were combined and distilled under reduced pressure to remove water and benzene. The residue therefrom was fractionally distilled to obtain a 3-isobutoxyphthalide product boiling from 175° to 178° C. at 17 millimeters pressure and having a refractive index $n_D^{20}$ of 1.5109. The yield of the product was 156.5 grams or 76 percent of theoretical.

*Example 3.—3-normal-octyloxyphthalide*

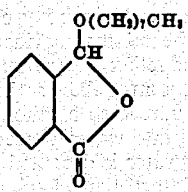

150 grams (1.0 mole) of phthalaldehydic acid and 300 milliliters (1.89 moles) of normal-octyl alcohol were mixed and heated at reflux temperature for 7 hours. The resulting crude product was heated to remove water and unreacted octyl alcohol, and to obtain a 3-normal-octyloxyphthalide product as an oily residue. The latter was purified by reduced pressure distillation. The desired compound was a fraction boiling from 172° to 177° C. at 4 millimeters pressure and had a refractive index $n_D^{20}$ of 1.5078.

*Example 4*

In similar preparations, the following derivatives were obtained from the reaction of aliphatic alcohols with phthalaldehydic acid.

A 3-normal-butoxyphthalide product, boiling from 184° to 186° C. at 17 millimeters pressure and having a refractive index $n_D^{20}$ of 1.5126, from the reaction of normal-butyl alcohol and phthalaldehydic acid.

A 3-tertiary-butoxyphthalide product, melting from 68° to 72° C., from the reaction of tertiary-butyl alcohol and phthalaldehydic acid.

*Example 5*

93 grams (0.5 mole) of x-chlorophthaldehydic acid (a phthalaldehydic acid containing a chlorine atom in the aromatic ring) and 150 milliliters (0.95 mole) of octyl alcohol were mixed and heated to from 110° to 115° C. and under reflux for 7 hours. The mixture was then heated under reduced pressure to vaporize water and unreacted octyl alcohol and to obtain as residue a 3-octyloxy-x-chlorophthalide product. The latter was fractionally distilled at reduced pressure to recover a purified product boiling from 187° to 207° C. at 6 millimeters pressure.

In similar preparation, the following lower alkoxyphthalides are prepared.

3-normal-heptyloxyphthalide by the reaction of phthalaldehydic acid and normal-heptyl alcohol.

3-normal-pentyloxyphthalide by the reaction of phthalaldehydic acid and normal-pentyl alcohol.

3-tertiary-butoxy-x-chlorophthalide by the reaction of x-chlorophthalaldehydic acid and tertiary-butyl alcohol.

3-isobutoxy-x-chlorophthalide by the reaction of x-chlorophthalaldehydic acid and isobutyl alcohol.

3-normal-hexyloxy-x-chlorophthalide by the reaction of x-chlorophthalaldehydic acid and normal-hexyl alcohol.

The products of this invention are useful for the control of the larvae of rootknot nematodes. In a representative operation, 3-normal-octyloxyphthalide was dispersed in water to prepare a composition containing 10 parts of phthalide per million parts of dispersion. This composition gave good control of larvae of the rootknot nematode (Meloidogyne species) contacted therewith.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid and ferric chloride solution, as more fully disclosed and claimed in a copending application of James D. Head and Owen D. Ivins, Serial Number 279,682, filed March 31, 1952, now Patent No. 2,748,162.

The x-chlorophthalaldehydic acid employed in this invention may be prepared by first chlorinating o-xylene in the presence of ferric chloride in the temperature range of from 5° to 15° C. to obtain a ring-chlorinated product, x-chloro-o-xylene. The ring chlorinated product is then photo-chlorinated to obtain $\alpha,\alpha,\alpha,\alpha',\alpha'$-x-hexachloro-o-xylene and the latter hydrolyzed in a manner similar to that described above for phthalaldehydic acid.

We claim:
1. The phthalide having the formula

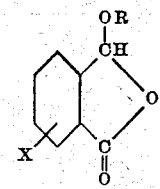

wherein R represents a lower alkyl radical containing from 4 to 8 carbon atoms, inclusive, and X is a member of the group consisting of chlorine and hydrogen.

2. 3-secondary-butoxyphthalide.
3. 3-isobutoxyphthalide.
4. 3-normal-butoxyphthalide.
5. 3-tertiary-butoxyphthalide.
6. 3-normal-octyloxyphthalide.

References Cited in the file of this patent

Grove: Biochem. J., 54 pp., 664–673 (1953).
Racine: Annalen, vol. 239, page 83 (1887).
Auwers et al.: Berichte 52, pp. 587, 596 (1919).
Kohlrausch et al.: Berichte 77, page 471 (1944).